(12) United States Patent
Walley et al.

(10) Patent No.: US 8,233,870 B2
(45) Date of Patent: Jul. 31, 2012

(54) MULTIPLE FREQUENCY BAND MULTIPLE STANDARD TRANSCEIVER

(75) Inventors: John Walley, Ladera Ranch, CA (US); Jeyhan Karaoguz, Irvine, CA (US); Brima B. Ibrahim, Aliso Viejo, CA (US); Arya Reza Behzad, Poway, CA (US); Vinko Erceg, Cardiff By The Sea, CA (US); David Rosmann, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 713 days.

(21) Appl. No.: 12/328,560

(22) Filed: Dec. 4, 2008

(65) Prior Publication Data

US 2010/0144288 A1    Jun. 10, 2010

(51) Int. Cl.
*H04B 1/06*    (2006.01)
*H04B 7/00*    (2006.01)

(52) U.S. Cl. ........................................ 455/266
(58) Field of Classification Search .................. 455/266
See application file for complete search history.

(56) References Cited

U.S. PATENT DOCUMENTS

| | | | | |
|---|---|---|---|---|
| 4,792,993 A * | 12/1988 | Ma | ................................ | 455/266 |
| 5,222,255 A * | 6/1993 | Kuo et al. | ...................... | 455/266 |
| 7,035,358 B1 * | 4/2006 | Sankaran et al. | ............. | 375/344 |
| 7,082,294 B2 * | 7/2006 | Denis et al. | .................... | 455/260 |
| 7,274,326 B2 * | 9/2007 | Gibson et al. | .................. | 342/195 |
| 7,359,691 B2 * | 4/2008 | Adachi et al. | .................. | 455/266 |
| 2002/0196876 A1 * | 12/2002 | Takada | ............................. | 375/346 |
| 2003/0100272 A1 * | 5/2003 | Denis et al. | ...................... | 455/80 |
| 2003/0153294 A1 * | 8/2003 | Hata | ............................... | 455/302 |
| 2004/0213366 A1 * | 10/2004 | Ono | ................................. | 375/348 |
| 2005/0079847 A1 * | 4/2005 | Arafa | ............................. | 455/272 |
| 2005/0215204 A1 * | 9/2005 | Wallace et al. | .................. | 455/78 |
| 2006/0084469 A1 * | 4/2006 | Malone et al. | .............. | 455/552.1 |
| 2007/0149143 A1 * | 6/2007 | Kim et al. | ......................... | 455/76 |
| 2007/0201590 A1 * | 8/2007 | Kolze et al. | ..................... | 375/350 |
| 2008/0171510 A1 * | 7/2008 | Aizawa | .......................... | 455/3.02 |

* cited by examiner

*Primary Examiner* — Quan Tra
(74) *Attorney, Agent, or Firm* — Garlick & Markison; Holly L. Rudnick

(57) ABSTRACT

A transceiver includes a receiver section and a transmitter section. The receiver section converts an inbound Multiple Frequency Bands Multiple Standards (MFBMS) signal into a down converted signal, wherein the inbound MFBMS signal includes a desired signal component and an undesired signal component. In addition, the receiver section determines spectral positioning of the undesired signal component with respect to the desired signal component and adjusts at least one of the MFBMS signal and the down converted signal based on the spectral positioning to substantially reduce adverse affects of the undesired signal component on the desired signal component to produce an adjusted signal. The transmitter section converts an outbound symbol stream into an outbound MFBMS signal.

21 Claims, 13 Drawing Sheets

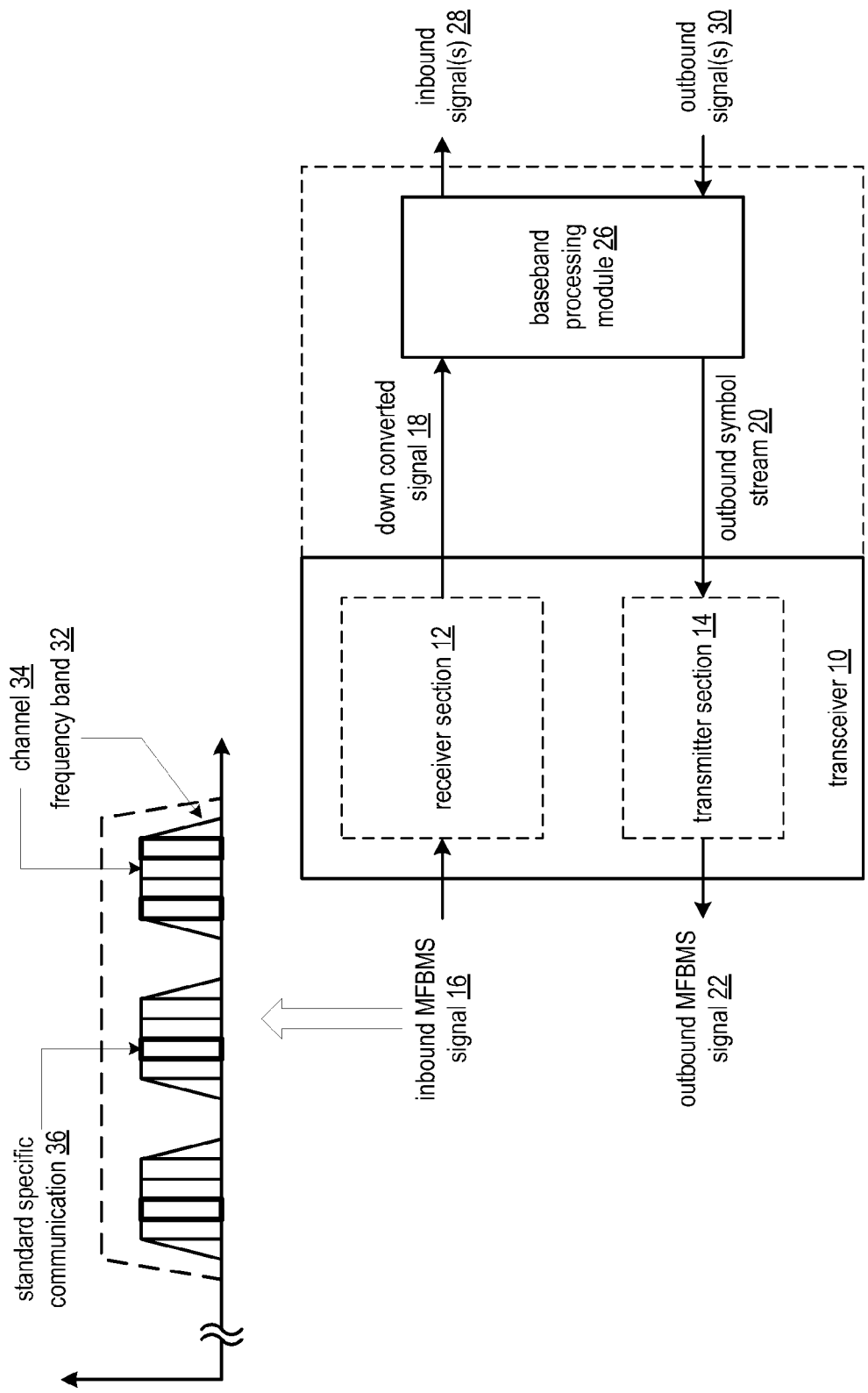

MULTIPLE FREQUENCY BAND MULTIPLE STANDARD TRANSCEIVER

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to transceivers that operate in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Many wireless transceivers are able to support multiple communication standards, which may be in the same frequency band or in different frequency bands. For example, a wireless transceiver may support Bluetooth communications for a personal area network and IEEE 802.11 communications for a Wireless Local Area Network (WLAN). In this example, the IEEE 802.11 communications and the Bluetooth communications may be within the same frequency band (e.g., 2.4 GHz for IEEE 802.11b, g, etc.). Alternatively, the IEEE 802.11 communications may be in a different frequency band (e.g., 5 GHz) than the Bluetooth communications (e.g., 2.4 GHz). For Bluetooth communications and IEEE 802.11b, (g), etc. communications there are interactive protocols that appear to the user as simultaneous implementation, but is actually a shared serial implementation. As such, while a wireless transceiver supports multiple types of standardized communications, it can only support one type of standardized communication at a time.

In addition, a transceiver that supports multiple standards includes multiple radio frequency (RF) front-ends (e.g., on the receiver side, separate LNA, channel filter, and IF stages for each standard and, on the transmitter side, separate IF stages, power amplifiers, and channels filters for each standard). As such, multiple standard transceivers include multiple separate RF front-ends; one for each standard in a different frequency band, channel utilization scheme (e.g., time division multiple access, frequency division multiple access, code division multiple access, orthogonal frequency division multiplexing, etc.), and/or data modulation scheme (e.g., phase shift keying, frequency shift keying, amplitude shift keying, combinations and/or variations thereof).

Further, transceivers that support full duplex communications require a technique to minimize the adverse affects of transmissions upon receptions of RF signals. Many standards account for this by providing a transmission frequency and a reception frequency (e.g., 1920-1980 MHz for uplink WCDMA communications and 2110-2170 MHz for downlink WCDMA communications). While standardized transmission and reception frequencies eliminate direct overlap, the transmitted signal still adversely affects the received signal when the signal strength difference is substantial (e.g., 60 dBm or more). In this instance, further reduction of the transmit signal is needed within the receiver section, which may be achieved by using a duplexer and/or blocking. In a multiple standard transceiver, such conventional approaches may not provide sufficient reduction of the transmit signal.

Therefore, a need exists for a transceiver that is capable of at least partially overcoming one or more of the above mentioned multiple standard limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 1 is a schematic block diagram of an embodiment of a transceiver in accordance with the present invention;

DETAILED DESCRIPTION OF THE INVENTION

Figure 3:
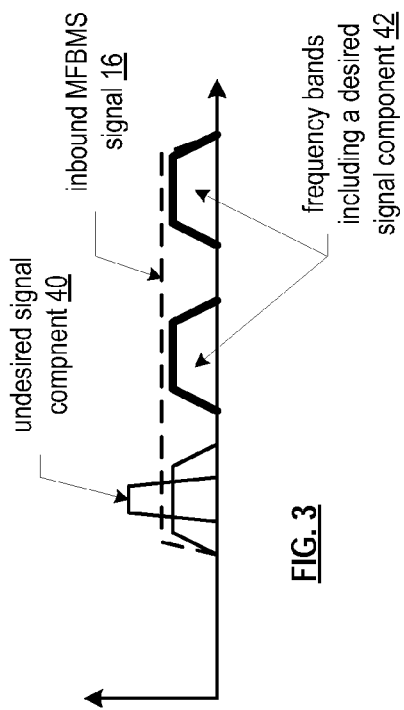
FIG. 3 is a diagram of another example of a multiple frequency band multiple standard (MFBMS) signal in accordance with the present invention.

FIG. 1 is a schematic block diagram of an embodiment of a transceiver 10 that includes a receiver section 12 and a transmitter section 14. The transceiver 10 may further include a baseband processing module 26, which may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 26 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 26 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 26 executes, hard coded and/or operational instructions corresponding to at least some of the steps and/or functions illustrated in FIGS. 1-16.

In an embodiment, the transceiver 10 includes the receiver section 12 and the transmitter section 14 on a single integrated circuit (IC). In another embodiment, the transceiver 10 includes the receiver section 12 on one IC and the transmitter section on another IC. In yet another embodiment, the transceiver includes the receiver section 12, the transmitter section 14, and the baseband processing module 26 on a single IC. In further embodiment, the transceiver 10 includes the receiver section 12 and the transmitter section 14 on one IC and the baseband processing module 26 on another IC. In yet a further embodiment, the transceiver 10 includes each of the receiver section 12, the transmitter section 14, and the baseband processing module 26 on separate ICs.

In operation, the baseband processing module 26 converts one or more outbound signals 30 into an outbound symbol stream 20 in accordance with one or more standards. For example, if the transceiver 10 is currently supporting a single standardized communication (e.g., IEEE 802.11, Bluetooth, GSM, CDMA, RFID, EDGE, GPRS, WCDMA, HSDPA, HSUPA, combinations and/or variations thereof), the baseband processing module 26 converts a single outbound signal 30 into the outbound symbol stream 20 in accordance with the standard. As another example, if the transceiver 10 is currently supporting two or more standards, the baseband processing module 26 converts two or more outbound signals 30 (one for each standard) into the outbound symbol stream 30. In this example, the outbound symbol stream 30 may include individual symbol streams for each outbound signal 30, a composite outbound symbol stream that includes a combination of the individual symbol streams, and/or a combination thereof.

The baseband processing module 26 may convert the outbound signal(s) 30 into the outbound symbol stream 20 by performing one or more of encoding (e.g., ½ rate, ⅔ rate, or other rate convolutional encoding, scrambling, puncturing, and/or any other type of encoding), interleaving, data modulation (e.g., x-QAM mapping, FSK modulation, QPSK modulation, BPSK modulation, ASK modulation, etc.), and frequency-to-time domain conversion (e.g., inverse fast Fourier transform). In addition, the baseband processing module 26 may employ a channel usage scheme to produce the outbound symbol stream 20. The channel usage scheme may be time division multiple access (TDMA), frequency divisional multiple access (FDMA), code division multiple access (CDMA), orthogonal frequency division multiplexing (OFDM), a combination thereof, and/or variations thereof.

The transmitter section 14 converts the outbound symbol stream 20 into a multiple frequency band multiple standard (MFBMS) signal 22, which includes at least one signal component in one or more frequency bands (e.g., 1800 MHz, 1900 MHz, 2100 MHz, 2.4 GHz, 5 GHz, 29 GHz, 60 GHz, etc.). As such, the resulting MFBMS signal 22 has a bandwidth that spans one or more frequency bands. In an embodiment, the transmitter section 14 may be done by mixing the outbound symbol stream 20 with a local oscillation to produce an up-converted signal. One or more power amplifiers and/or power amplifier drivers amplifies the up-converted signal to produce the outbound MFBMS signal 22.

In another embodiment, the transmitter section 14 includes an oscillator that produces an oscillation. The outbound symbol stream 20 provides phase information (e.g., ±Δθ [phase shift] and/or θ(t) [phase modulation]) that adjusts the phase of the oscillation to produce a phase adjusted signal, which is transmitted as the outbound MFBMS signal 22. In another embodiment, the outbound symbol stream 20 includes amplitude information (e.g., A(t) [amplitude modulation]), which is used to adjust the amplitude of the phase adjusted signal to produce the outbound MFBMS signal 22.

In yet another embodiment, the transmitter section 14 includes an oscillator that produces an oscillation. The outbound symbol stream 20 provides frequency information (e.g., ±Δf [frequency shift] and/or f(t) [frequency modulation]) that adjusts the frequency of the oscillation to produce a frequency adjusted signal, which is transmitted as the outbound MFBMS signal 22. In another embodiment, the outbound symbol stream 20 includes amplitude information, which is used to adjust the amplitude of the frequency adjusted signal to produce the outbound MFBMS signal 22. In a further embodiment, the transmitter section 14 includes an oscillator that produces an oscillation. The outbound symbol stream 20 provides amplitude information (e.g., ±ΔA [amplitude shift] and/or A(t) [amplitude modulation]) that adjusts the amplitude of the oscillation to produce the outbound MFBMS signal 22.

The receiver section 12 receives an inbound MFBMS signal 16, which includes a plurality of frequency bands 32 (e.g., two or more). Each frequency band 32 may be divided into channels 34, which in turn may be further divided into one or more division multiple access slots (e.g., time, frequency, and/or code division multiple access slots). A standardized communication (e.g., IEEE 802.11, Bluetooth, GSM, CDMA, RFID, EDGE, GPRS, WCDMA, HSDPA, HSUPA, combinations and/or variations thereof) may use one more channels and/or division multiple access slots to support a communication. In some instances, multiple standards may utilize communication resources (e.g., channels and/or slots) within the same frequency band and/or across multiple frequency bands. Note that the MFBMS signal 16 has the potential to support multiple standardized communications concurrently, however, in many instances, the MFBMS signal 16 may have only one active standardized communication. Further note that the transmitter and receiver sections 12 and 14 may share one or more antennas or each may have its own one or more antennas. Still further note that the transmitter section 14 may generate the outbound MFBMS signal 22 based on an orthogonal relationship with the inbound MFBMS signal 16 to further reduce interference therebetween.

The receiver section 12 converts the MFBMS signal 16 into a down converted signal 18. The inbound MFBMS signal 16 may include one or more a desired signal components and one or more undesired signal components. The desired signal components correspond to an active standard specific communication 36, which is represented in this example via a bold line. As shown in this example, standard specific communications 36 may be in different frequency bands, in the same frequency bands using different channels or slots thereof, and/or in the same frequency band using the same channels, or slots thereof. The undesired signal component may be caused by transmitting of the outbound MFBMS signal 22 and/or by another transceiver transmitting at approximately the same frequency as the frequency of the frequency bands, or channels thereof, supporting a standard specific communication 36.

The receiver section 12 functions to determine spectral positioning of the undesired signal component with respect to the desired signal component. For example, the receiver section 12 may determine whether the undesired signal component is outside the frequency bands of interest (i.e., those containing a standard specific communication 36), is within a frequency band of interest, is caused by an interferer (i.e., another transceiver transmitting at approximately the same frequency), or is a blocking signal (i.e., the transmit signal of a full duplex standard specific communication 36).

The receiver section 12 then adjusts at least one of the MFBMS signal 16 and the down converted signal 218 based on the spectral positioning to substantially reduce adverse affects of the undesired signal component on the desired signal component to produce an adjusted signal. The adjusting may be done by reducing the bandwidth of the receiver section 12 such that the undesired signal component is outside of the adjusted bandwidth of the receiver section 12 while the desired signal component is within the adjusted bandwidth. Alternatively and/or in addition to, the adjusting may be done by filtering the MFBMS signal 16 to attenuate the undesired signal component. As yet another alternative and/or in addition, the adjusting may be done by blocking the undesired signal component.

Figure 2:
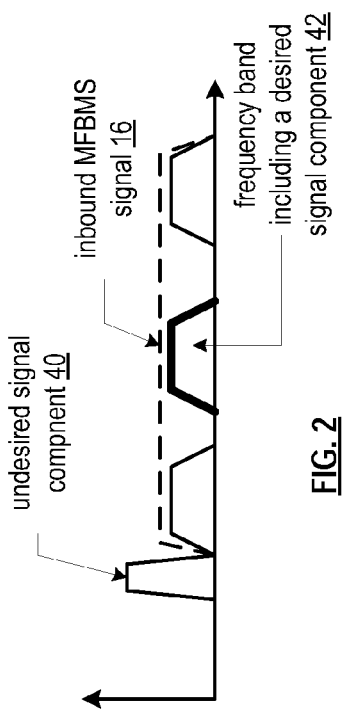
FIG. 2 is a diagram of an example of a multiple frequency band multiple standard (MFBMS) signal in accordance with the present invention.

FIG. 2 is a diagram of an example of an inbound multiple frequency band multiple standard (MFBMS) signal 16 that has an undesired signal component 40 adjacent thereto. In this example, the undesired signal component 40 may be an interferer signal (i.e., a transmit signal from another transceiver not involved in a standard specific communication 36 with the present transceiver). As is further shown, the center frequency band includes a desired signal component 42 (e.g., one or more slots and/or one or more channels supporting a standard specific communication 36).

When the receiver section 12 receives such a MFBMS signal 16, it determines the spectral position of the undesired signal component 40 with respect to the desired signal component 42. In this example, the undesired signal component 40 is substantially separated in frequency from the desired signal component 42 such that, if the signal strength of the undesired signal component 40 is not significantly greater than the signal strength of the inbound MFBMS signal 16 (e.g., less than 40 dBm), then, in many instances, it may be ignored since it will not have a substantial adverse affect (e.g., interference) on the desired signal component 42. If, however, the signal strength is significantly greater, then the undesired signal component 40 may be filtered, blocked, and/or the bandwidth of the receiver section is adjusted such that it does not substantially adversely affect the desired signal component 42.

FIG. 3 is a diagram of another example of a multiple frequency band multiple standard (MFBMS) signal 16 that has an undesired signal component 40 within one of the frequency bands. In this example, the undesired signal component 40 may be an interferer signal (i.e., a transmit signal from another transceiver not involved in a standard specific communication 36 with the present transceiver) or a blocking signal (e.g., the present transceiver transmitting a signal). As is further shown, two frequency bands include a desired signal component 42 (e.g., one or more slots and/or one or more channels supporting a standard specific communication 36).

When the receiver section 12 receives such a MFBMS signal 16, it determines the spectral position of the undesired signal component 40 with respect to the desired signal component 42. In this example, the undesired signal component 40 is substantially separated in frequency from the desired signal component 42 such that, if the signal strength of the undesired signal component 40 is not significantly greater than the signal strength of the inbound MFBMS signal 16 (e.g., less than 40 dBm), then, in many instances, it may be ignored since it will not have a substantial adverse affect (e.g., interference) on the desired signal component 42. If, however, the signal strength is significantly greater, then the undesired signal component 40 may be filtered, blocked, and/or the bandwidth of the receiver section is adjusted such that it does not substantially adversely affect the desired signal component 42.

Figure 4:
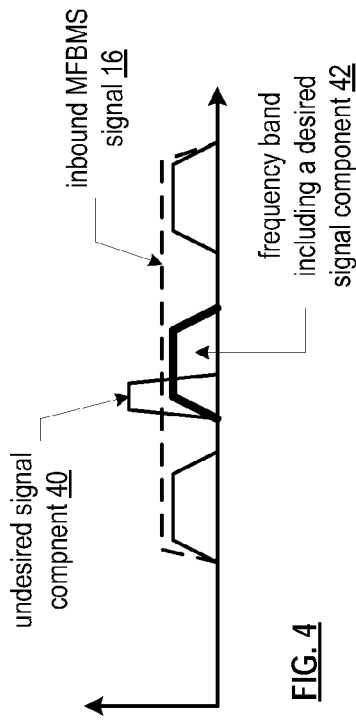
FIG. 4 is a diagram of another example of a multiple frequency band multiple standard (MFBMS) signal in accordance with the present invention.

FIG. 4 is a diagram of another example of a multiple frequency band multiple standard (MFBMS) signal 16 that has an undesired signal component 40 within one of the frequency bands. In this example, the undesired signal component 40 may be an interferer signal (i.e., a transmit signal from another transceiver not involved in a standard specific communication 36 with the present transceiver) or a blocking signal (e.g., the present transceiver transmitting a signal). As is further shown, the same frequency band includes a desired signal component 42 (e.g., one or more slots and/or one or more channels supporting a standard specific communication 36).

When the receiver section 12 receives such a MFBMS signal 16, it determines the spectral position of the undesired signal component 40 with respect to the desired signal component 42. In this example, the undesired signal component 40 is substantially close in frequency from the desired signal component 42 such that it will have a substantial adverse affect (e.g., interference, which reduces the sensitivity of the receiver section 12) on the desired signal component 42. As such, the undesired signal component 40 may be filtered and/or blocked such that it does not substantially adversely affect the desired signal component 42.

In the examples of FIGS. 2-4, only one undesired signal component 40 is shown, however, there may be a plurality of undesired signal components 40. In this instance, the receiver section 12 individually determines the spectral position of the undesired signal components and their individual positioning with respect to one or more desired signal components 42. For each undesired signal component, the receiver section 12 ignores it, filters it, blocks it, and/or adjusts it bandwidth.

Figure 5:
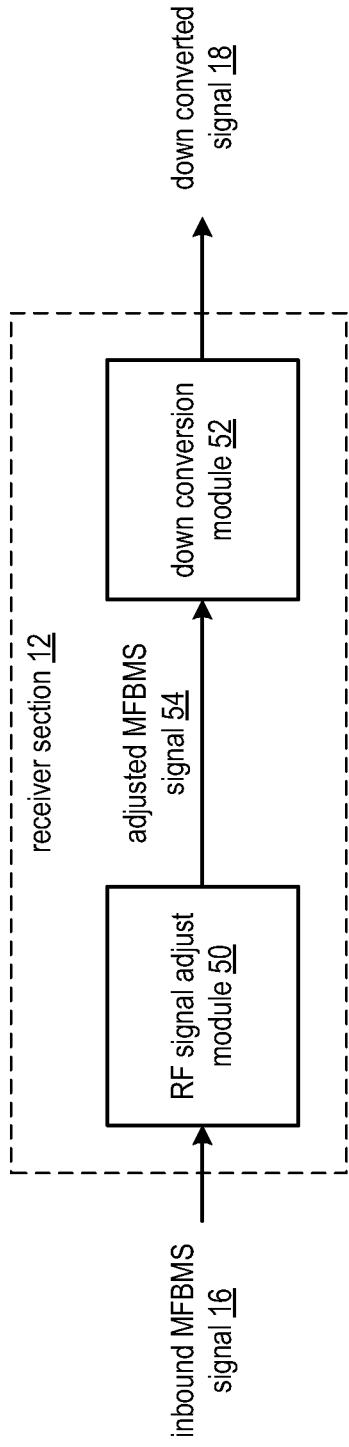
FIG. 5 is a schematic block diagram of an embodiment of a receiver section in accordance with the present invention.

FIG. 5 is a schematic block diagram of an embodiment of a receiver section 12 that includes an RF signal adjust module 50 and a down conversion module 52. The signal adjust module 50 is coupled to receive a Multiple Frequency Bands Multiple Standards (MFBMS) signal 16, which includes an undesired signal component and at least one desired signal component. The signal adjust module 50 functions to determine spectral positioning of the undesired signal component with respect to the desired signal component. The signal adjust module 50 further functions to adjust the MFBMS signal 16 based on the spectral positioning to produce an adjusted MFBMS signal 54, which includes a reduction of the undesired signal component such that its adverse affects on the desired signal component are reduced. Various embodiments of the signal adjust module 50 will be further discussed with reference to FIGS. 7-13.

The down conversion module 52 convert the adjusted MFBMS signal 54 into a down converted symbol stream or signal 16. In an embodiment, the down conversion module 52 mixes in-phase (I) and quadrature (Q) components of the adjusted MFBMS signal 54 with in-phase and quadrature components of receiver local oscillation to produce a mixed I signal and a mixed Q signal. The mixed I and Q signals are combined to produce the inbound symbol stream. As an example, the inbound symbol stream includes phase information (e.g., ±Δθ [phase shift] and/or θ(t) [phase modulation]) and/or frequency information (e.g., ±Δf [frequency shift] and/or f(t) [frequency modulation]). In another embodiment and/or in furtherance of the preceding embodiment, inbound MFBMS signal 16 includes amplitude information (e.g., ±ΔA [amplitude shift] and/or A(t) [amplitude modulation]). To recover the amplitude information, the down conversion module 52 further includes an amplitude detector such as an envelope detector, a low pass filter, etc.

When the MFBMS signal 16 includes the desired signal component and a second desired signal component, the signal adjust module 50 functions to determine spectral positioning of the undesired signal component with respect to the desired signal component and the second desired signal component. In addition, the signal adjust module 50 adjusts the MFBMS signal to substantially reduce adverse affects of the undesired signal component on the desired signal component and the second desired signal component to produce the adjusted MFBMS signal 54. In this instance, the down conversion module 52 converts the adjusted MFBMS signal 54 into the down converted symbol stream, or signal, 18, which includes a first symbol stream corresponding to the desired signal component and a second symbol stream corresponding to the second desired signal component.

Figure 6:
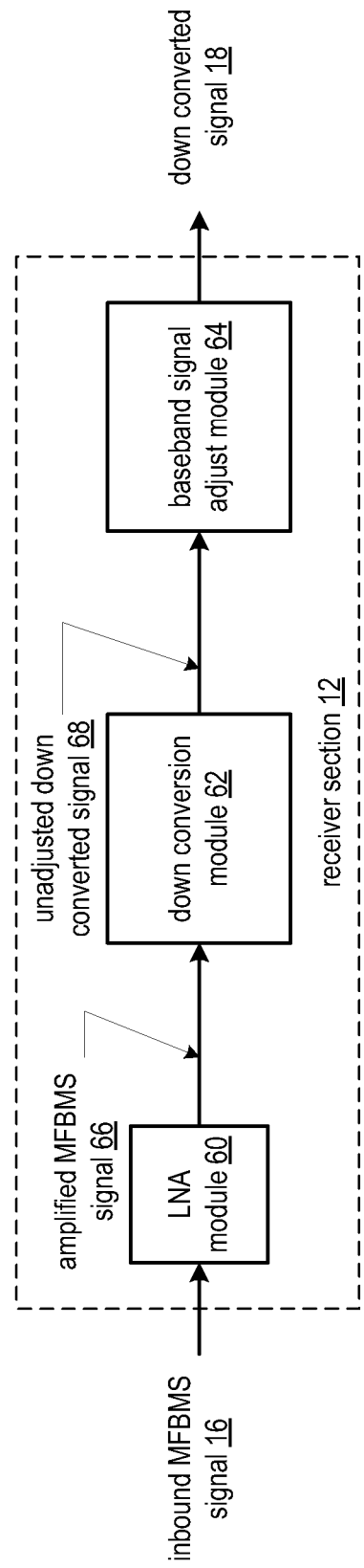
FIG. 6 is a schematic block diagram of another embodiment of a receiver section in accordance with the present invention.

FIG. 6 is a schematic block diagram of another embodiment of a receiver section 12 that includes a low noise amplifier module 60, a down conversion module 62, and a baseband signal adjust module 64. The low noise amplifier (LNA) module 60 includes one or more low noise amplifiers coupled in series, in parallel, or a combination thereof to amplify the inbound MFBMS signal 16 to produce an amplified MFBMS signal 66.

The down conversion module 62, which may be similar to down conversion module 52, converts the amplified MFBMS signal 66 into an unadjusted down converted signal 68, which includes a desired signal component and an undesired signal component.

The signal adjust module 64 determines spectral positioning of the undesired signal component with respect to the desired signal component. The signal adjust module 64 then adjusts the unadjusted down converted signal 68 based on the spectral positioning to substantially reduce adverse affects of the undesired signal component on the desired signal component to produce an adjusted down converted signal 18. Various embodiments of the signal adjust module 64 are further discussed with reference to FIGS. 14-16.

Figure 7:
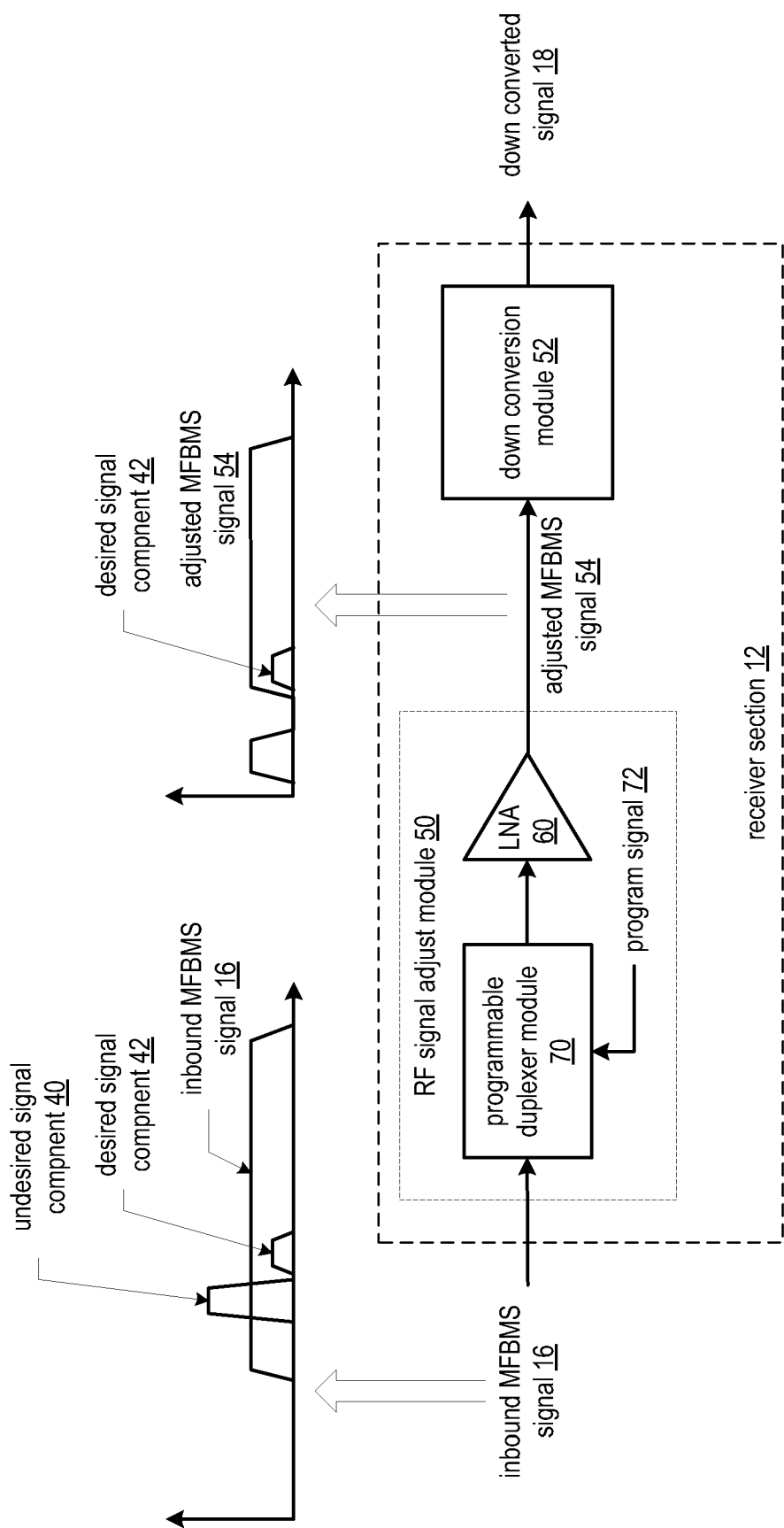
FIG. 7 is a schematic block diagram of another embodiment of a receiver section in accordance with the present invention.

FIG. 7 is a schematic block diagram of another embodiment of a receiver section 12 that includes the RF signal adjust module 50 and the down conversion module 52. The RF signal adjust module 50 includes a programmable duplexer module 70 and a low noise amplifier module 60, which includes one or more low noise amplifiers coupled in series, in parallel, and/or a combination thereof. The programmable duplexer module 70 attenuates the undesired signal component 40 with respect to the MFBMS signal 16 based on a programming signal 72 to produce an attenuated MFBMS signal. The low noise amplifier (LNA) module 60 amplifies the attenuated MFBMS signal to produce the adjusted MFBMS signal 54, which is shown to have the undesired signal component 40 substantially reduced in signal strength. As such, by reducing the signal strength of the undesired signal component 40, it adverse affects on the desired signal component 42 are reduced.

Figure 8:
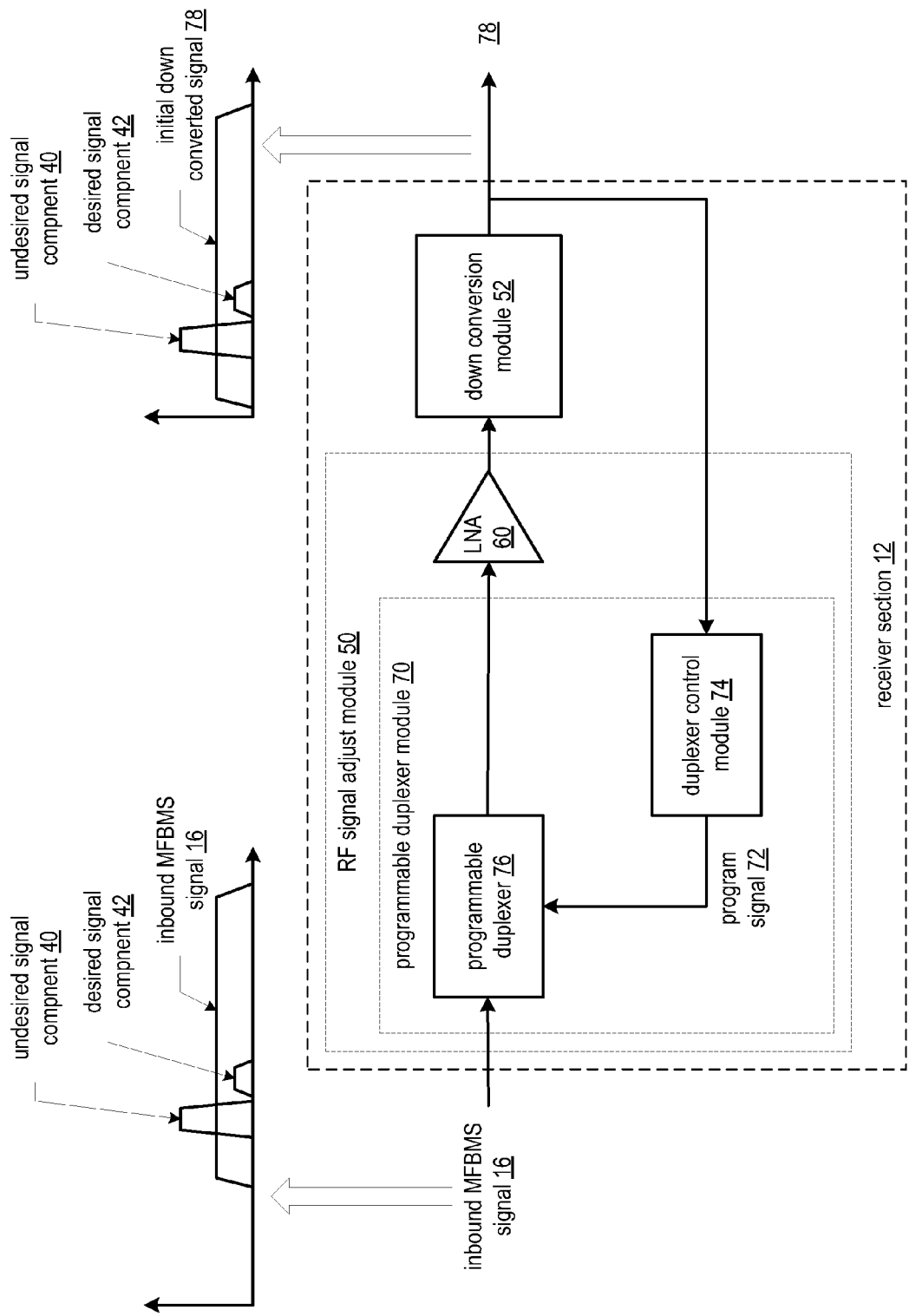
FIG. 8 is a schematic block diagram of another embodiment of a receiver section in accordance with the present invention.

FIG. 8 is a schematic block diagram of another embodiment of a receiver section 12 that includes the RF signal adjust module 50 and the down conversion module 52. The RF signal adjust module 50 includes a programmable duplexer module 70 and a low noise amplifier module 60. The programmable duplexer module 70 includes a programmable duplexer 76 and a duplexer control module 74, which may a separate processing module or included within the baseband processing module 26.

In operation, the duplexer control module 74 receives an initial down down converted signal 78 that includes the undesired signal component 40 and the desired signal component 42. The duplexer control module 74 determines the spectral position of the undesired signal component 40 during a calibration phase of the receiver section 12. The duplexer control module 74 then generates the programming signal 72 based on the spectral position of the undesired signal component 40. The programmable duplexer 76 adjusts its frequency response based on the program signal 72 to attenuate the undesired signal component 40.

Figure 9:
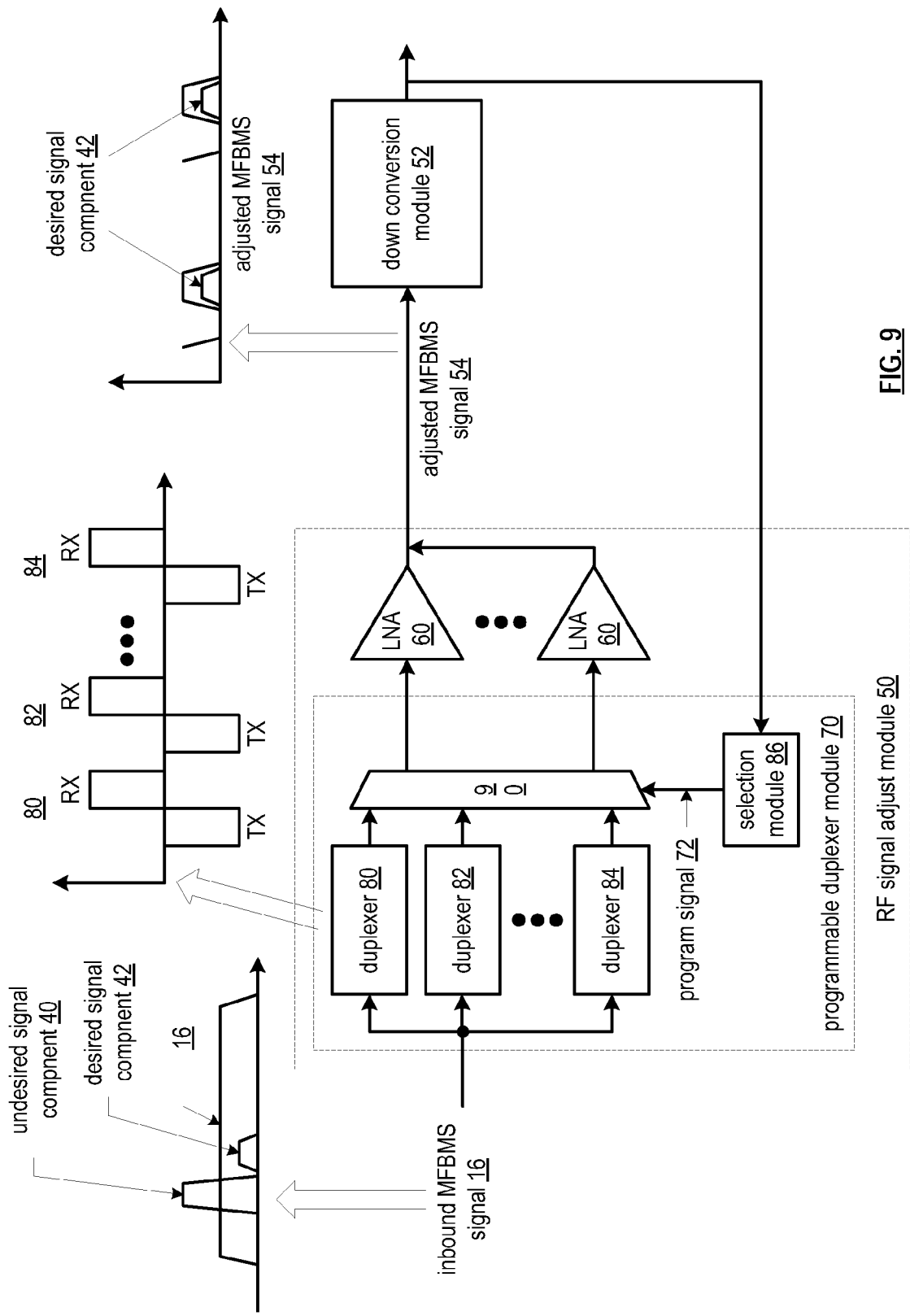
FIG. 9 is a schematic block diagram of another embodiment of a receiver section in accordance with the present invention.

FIG. 9 is a schematic block diagram of another embodiment of a receiver section 12 that includes the RF signal adjust module 50 and the down conversion module 52. The RF signal adjust module 50 includes a programmable duplexer module 70 and a low noise amplifier module 60. The programmable duplexer module 70 includes a plurality of duplexers 80-84, a multiplexer 90, and a selection module 86, which may a separate processing module or included within the baseband processing module 26. As shown, each duplexer 80-84 has a different frequency response (e.g., passes or amplifies a corresponding receive frequency (RX) and attenuates a corresponding transmit frequency TX)).

The selection module 86 determines spectral position of the undesired signal component 40 of an unadjusted down converted signal. The selection module 86 then generates the programming signal 72 based on the spectral position of the undesired signal component 40. The multiplexer couples one or more of the duplexers 80-84 at one or more of the LNA modules 60 based on programming signal 72. The one or more LNA modules 60 amplifies the inbound MFBMS signal 16 to produce the adjusted MFBMS signal 54.

Figure 10:
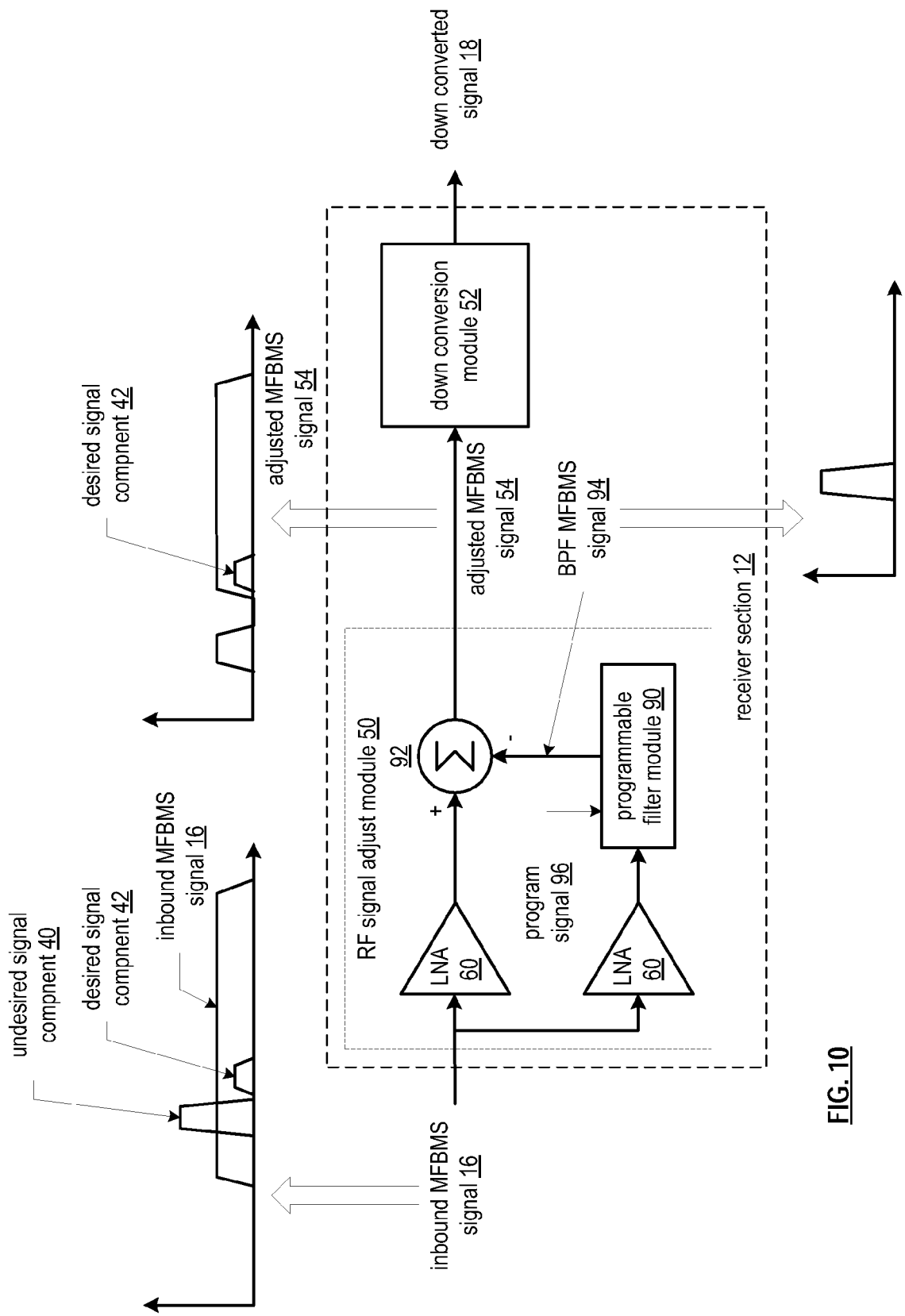
FIG. 10 is a schematic block diagram of another embodiment of a receiver section in accordance with the present invention.

FIG. 10 is a schematic block diagram of another embodiment of a receiver section 12 that includes the RF signal adjust module 50 and the down conversion module 52. The RF signal adjust module 50 includes a programmable filter module 90, low noise amplifier modules 60, and a subtraction module 92. The low noise amplifier modules 60 amplify the MFBMS signal 16 to produce amplified MFBMS signals.

The programmable filter module 90 band pass filter one of the amplified MFBMS signals based on a programming signal 96 to produce a band pass filtered (BPF) MFBMS signal 94. In this instance, the BPF MFBMS signal 94 includes the undesired signal component 40 with the remainder of the signal 16 being substantially attenuated, including the desired signal component 42.

The subtraction module 92 subtracts the band pass filtered MFBMS signal 94 from the amplified MFBMS signal to produce the adjusted MFBMS signal 54. For example, the adjusted MFBMS signal 54 includes a notch at the location of the undesired signal component 40 as a result of the subtraction.

Figure 11:
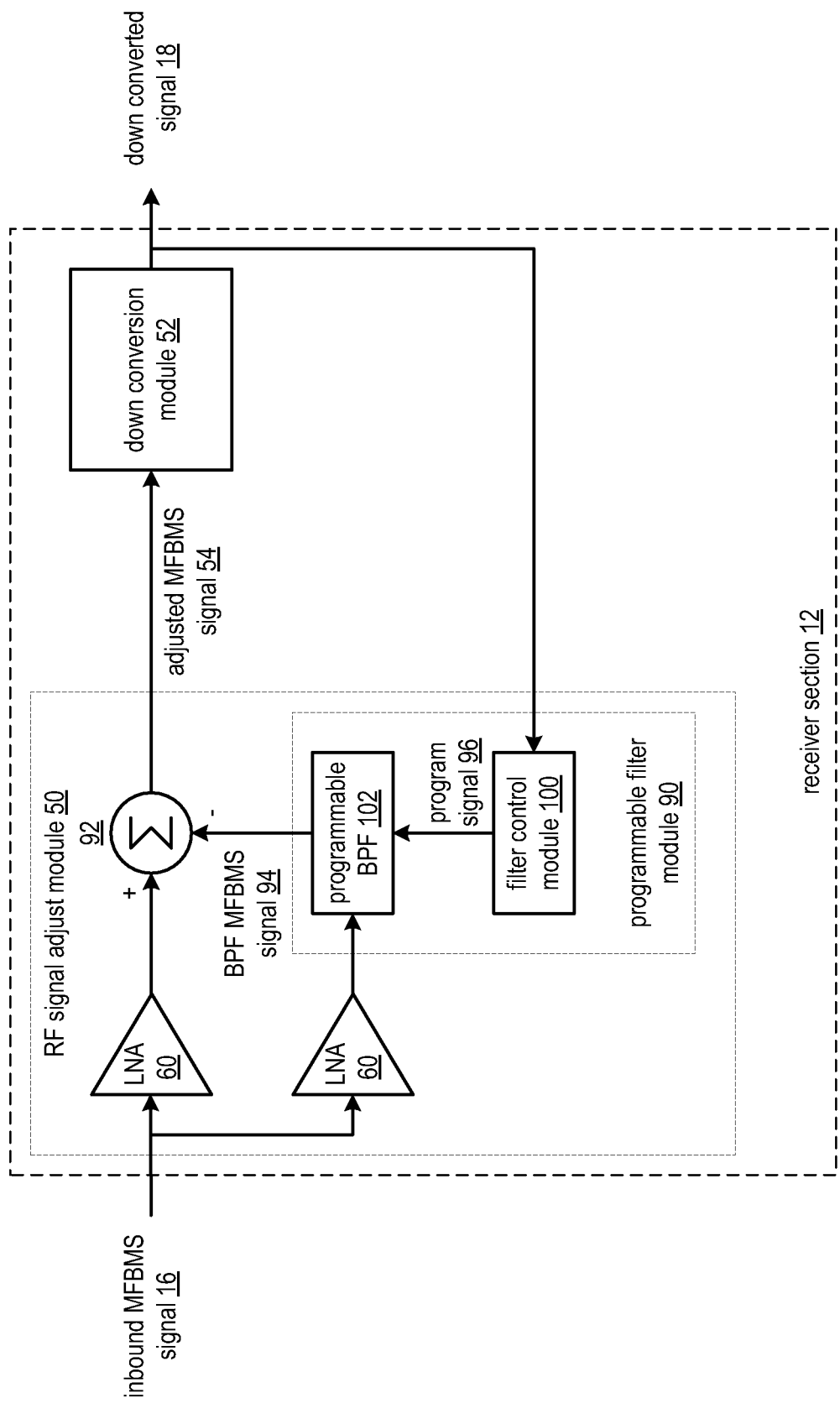
FIG. 11 is a schematic block diagram of another embodiment of a receiver section in accordance with the present invention.

FIG. 11 is a schematic block diagram of another embodiment of a receiver section 12 that includes the RF signal adjust module 50 and the down conversion module 52. The RF signal adjust module 50 includes a programmable filter module 90, low noise amplifier modules 60, and a subtraction module 92. The programmable filter module 90 includes a filter control module 100 and a programmable bandpass filter 102. The filter control module 100 may be a separate processing module or included in the baseband processing module 26.

The filter control module 100 determines spectral position of the undesired signal component 40 from the down converted signal 18 during an initialization phase. The filter 100 then generates a program signal 96 based on the spectral position of the undesired signal component. The programmable band pass filter 102 adjusted is band pass filter range and may further adjust it attenuation properties based on the program signal 96 and then filters the amplified inbound MFBMS signal to produce the band pass filter the MFBMS signal 94.

Figure 12:
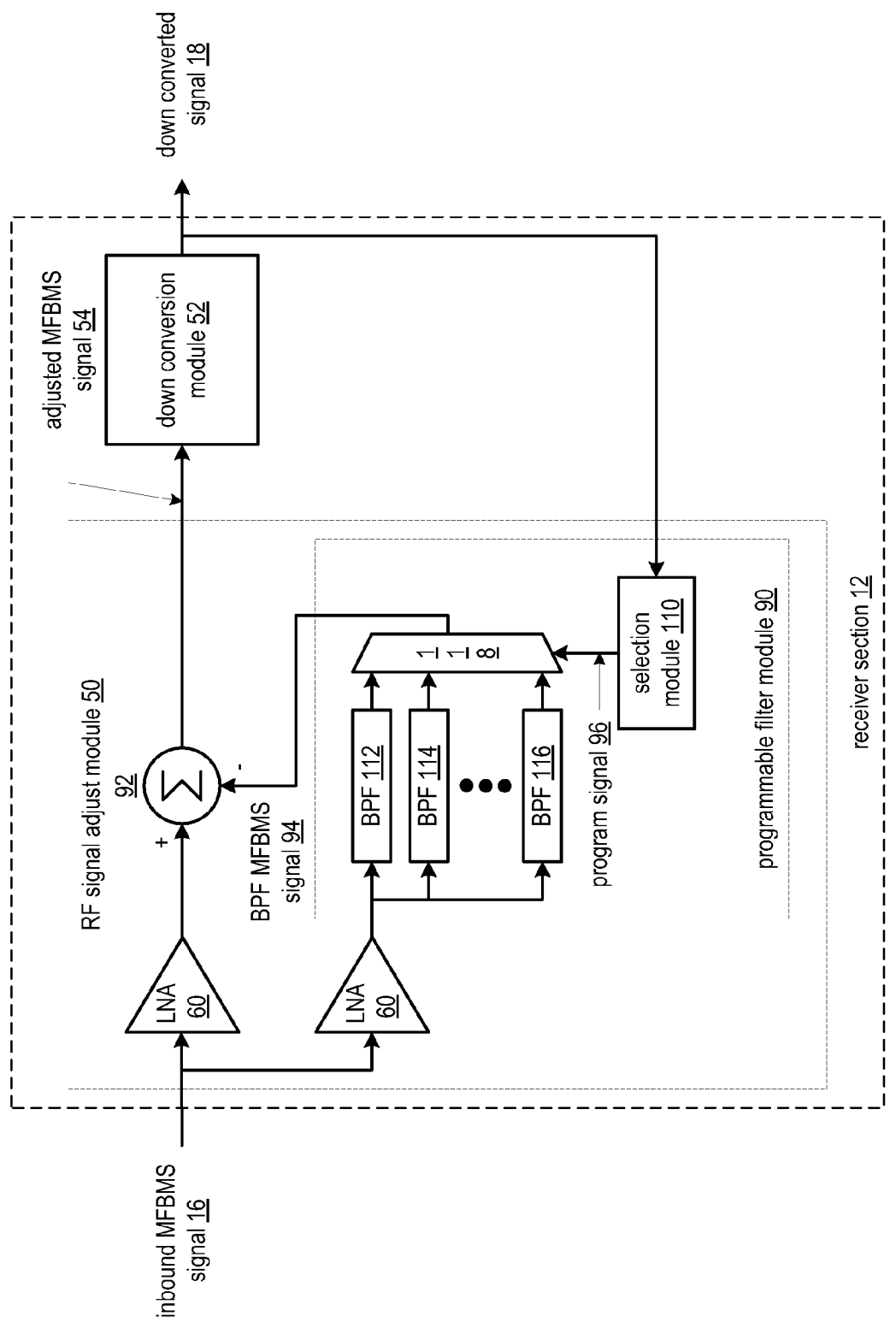
FIG. 12 is a schematic block diagram of another embodiment of a receiver section in accordance with the present invention.

FIG. 12 is a schematic block diagram of another embodiment of a receiver section 12 that includes the RF signal adjust module 50 and the down conversion module 52. The RF signal adjust module 50 includes a programmable filter module 90, low noise amplifier modules 60, and a subtraction module 92. The programmable filter module 90 includes a plurality of band pass filters 112-116, a multiplexer 118, and a selection module 110.

In this embodiment, the selection module 110, which may be a separate processing module or with the baseband processing module 26, determines spectral position of the undesired signal component 40. The selection module 110 then generates the programming signal 96 based on the spectral position of the undesired signal component. The multiplexer outputs the BPF MFBMS signal produced by one or more of the BPF 112-116 based on the programming signal 96 to produce the BPF MFBMS signal 94.

Figure 13:
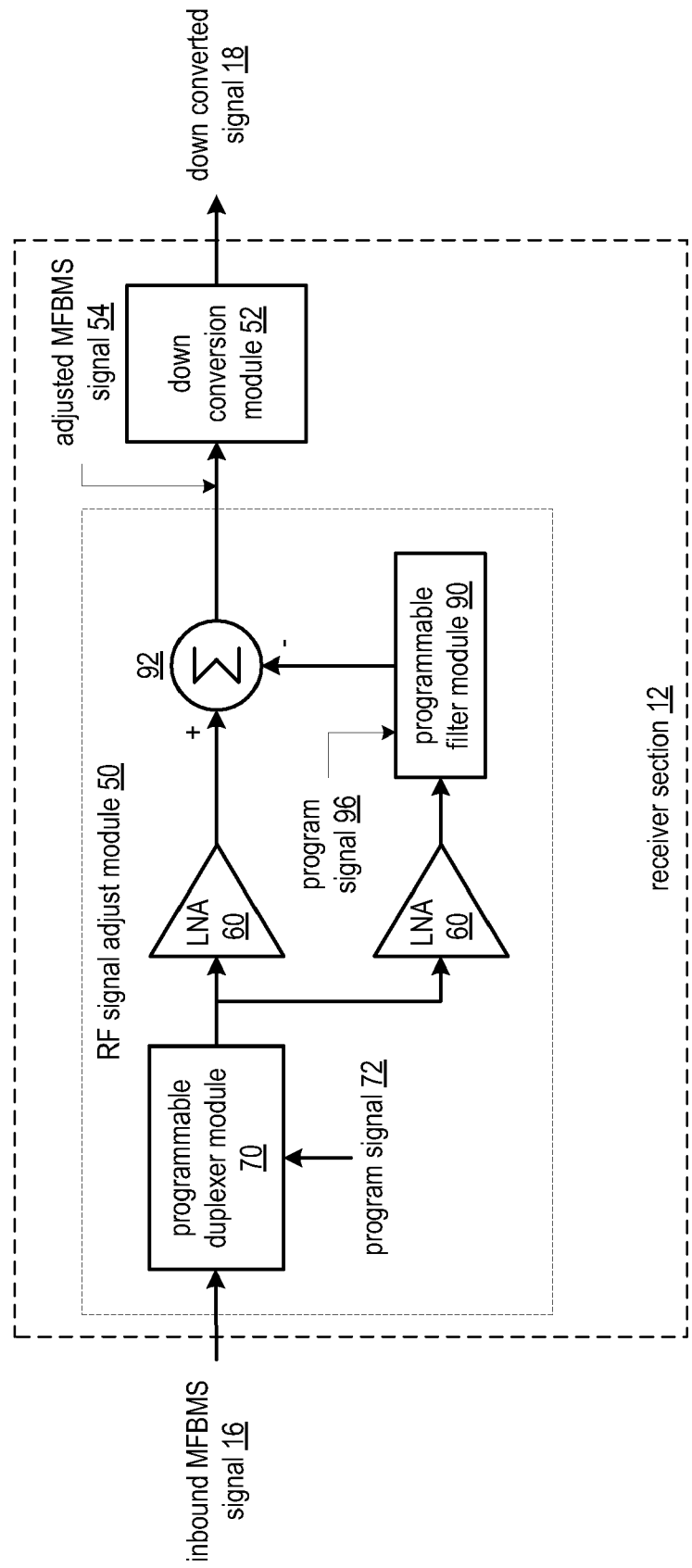
FIG. 13 is a schematic block diagram of another embodiment of a receiver section in accordance with the present invention.

FIG. 13 is a schematic block diagram of another embodiment of a receiver section 12 that includes the RF signal adjust module 50 and the down conversion module 52. The RF signal adjust module 50 includes the programmable duplexer module 70, the LNA modules 60, the programmable filter module 90, and the subtraction module 92.

The programmable duplexer module 70 attenuates the undesired signal component with respect to the MFBMS signal based on a duplexer programming signal 72 to produce an attenuated MFBMS signal. The low noise amplifier (LNA) modules 60 amplify the attenuated MFBMS signal to produce amplified MFBMS signals.

The programmable filter module 90 band pass filters the amplified MFBMS signal based on a filter programming signal 96 to produce a band pass filtered MFBMS signal. The subtraction module 92 subtract the band pass filtered MFBMS signal from the amplified MFBMS signal to produce the adjusted MFBMS signal 54.

Figure 14:
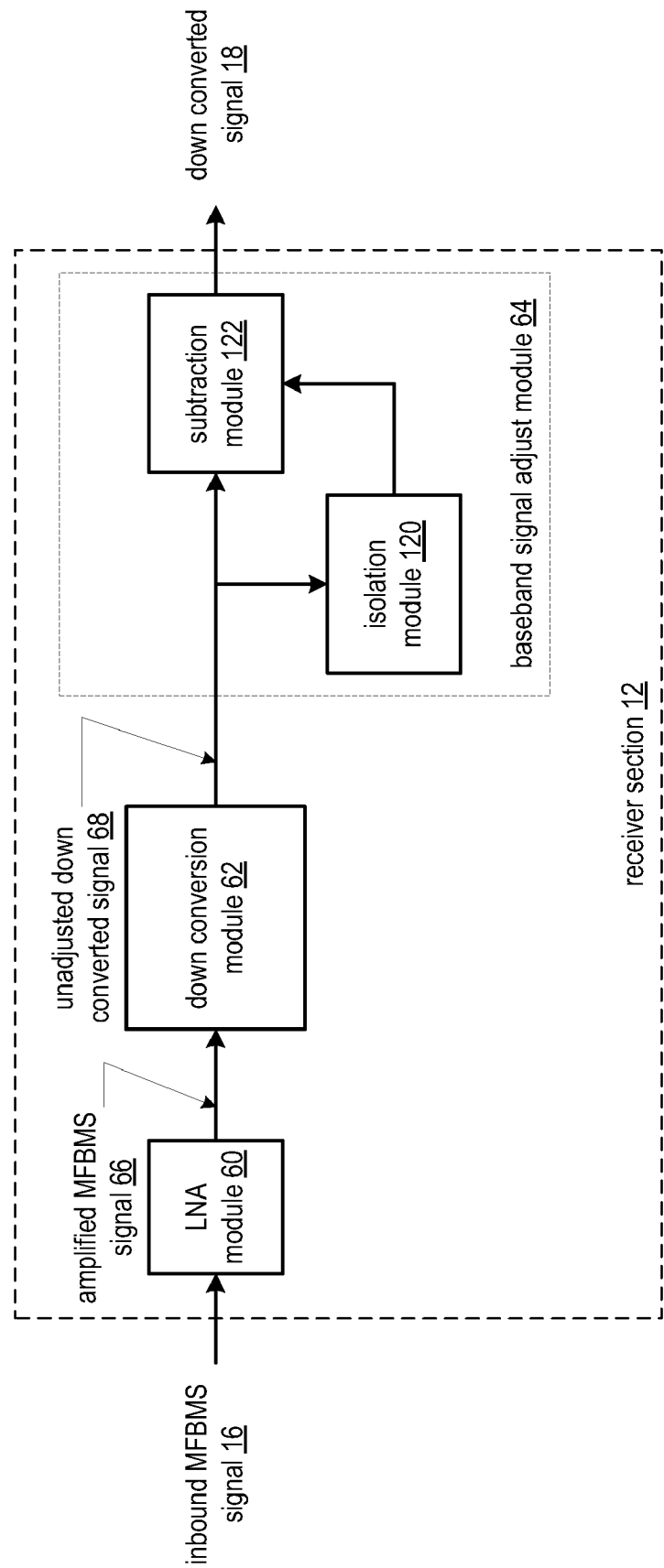
FIG. 14 is a schematic block diagram of another embodiment of a receiver section in accordance with the present invention.

FIG. 14 is a schematic block diagram of another embodiment of a receiver section 12 includes the LNA module 60, the down conversion module 62, and the baseband signal adjust module 64. The baseband signal adjust module 64 includes an isolation module 120 and a subtraction module 122. The LNA module 60 amplifies the inbound MFBMS signal 16 to produce the amplified MFBMS signal 66. The down conversion module 62 converts the amplified MFBMS signal 66 into the unadjusted down converted signal 68.

The isolation module 120 isolates the undesired signal component from the down converted signal to produce an isolated signal component. The subtraction module 122 subtracts the isolated signal component from the down converted signal to produce the adjusted down converted signal 18.

Figure 15:
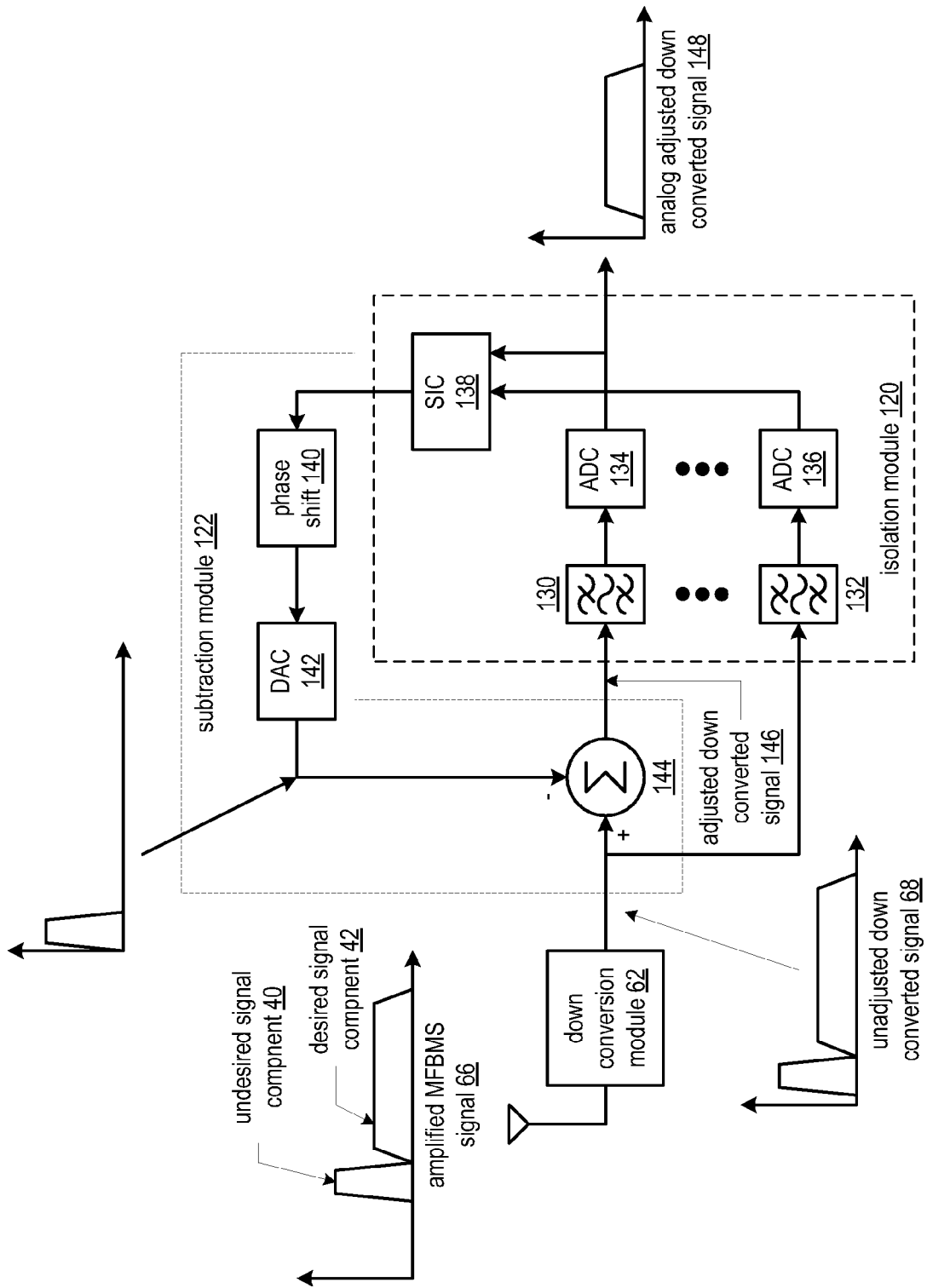
FIG. 15 is a schematic block diagram of an embodiment of a down conversion module and a baseband signal adjust module in accordance with the present invention.

FIG. 15 is a schematic block diagram of an embodiment of a down conversion module 62 and a baseband signal adjust module 64, which includes the isolation module 120 and the subtraction module 122. The isolation module 120 includes a plurality of filters 130-132, a plurality of analog to digital converters (ADC) 134-136, and a successive interference cancellation module 138. The subtraction module 122 includes a phase shift module 140, a digital to analog converter 142, and a subtracter 144.

The plurality of filters (e.g., band pass and/or low pass filters) filters the down converted signal 68 to produce a plurality of filtered signal components, wherein one of the plurality of filtered signal components corresponds to the isolated signal component. The plurality of analog to digital converters 134-136 converts the plurality of filtered signal components into a plurality of analog filtered signals, wherein one of them provides the analog adjusted down converted signal 148. The successive interference cancellation module 138 processes the one of the plurality of filtered signal components to produce an analog version of the isolated signal component.

The phase shift module 140 phase shifts the analog version of the isolated signal component to produce a phase shifted analog isolated signal component. Such phase shifted may be needed to adjust for timing differences in the feedback path to the subtraction module 144 and the received signal. The digital to analog converter 142 converts the phase shifted analog isolated signal component into the isolated signal component. The subtracter 144 subtracts the isolated signal component from the down converted signal to produce the adjusted down converted signal, which is subsequently filtered by filter 130 and converted to the analog adjusted down converted signal 148 by ADC 134.

Figure 16:
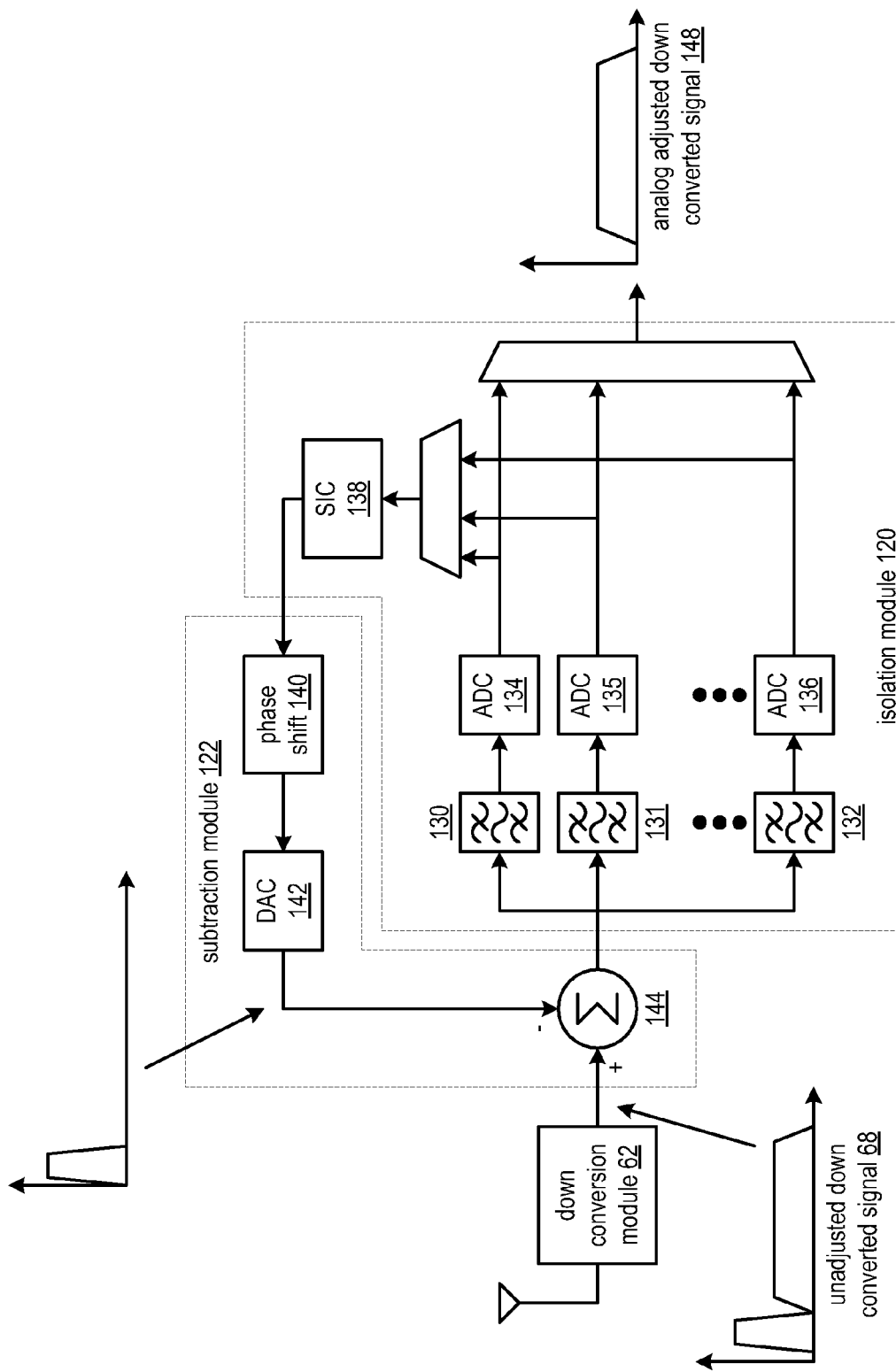
FIG. 16 is a schematic block diagram of an embodiment of a down conversion module and a baseband signal adjust module in accordance with the present invention.

FIG. 16 is a schematic block diagram of an embodiment of a down conversion module 62 and a baseband signal adjust module 64, which includes the isolation module 120 and the subtraction module 122. The isolation module 120 includes a plurality of filters 130-132, a plurality of analog to digital converters (ADC) 134-136, multiplexers, and a successive interference cancellation (SIC) module 138. The subtraction module 122 includes a phase shift module 140, a digital to analog converter 142, and a subtracter 144.

The plurality of filters 130-132 (e.g., band pass and/or low pass filters) filters the down converted signal 68 to produce a plurality of filtered signal components. The plurality of analog to digital converters 134-136 converts the plurality of filtered signal components into a plurality of analog filtered signals, wherein one of them is provided via a multiplexer to the SIC module 138 and another one is provided via the other multiplexer as the analog adjusted down converted signal 148. The successive interference cancellation module 138 processes the one of the plurality of filtered signal components to produce an analog version of the isolated signal component.

The phase shift module 140 phase shifts the analog version of the isolated signal component to produce a phase shifted analog isolated signal component. Such phase shifted may be needed to adjust for timing differences in the feedback path to the subtraction module 144 and the received signal. The digital to analog converter 142 converts the phase shifted analog isolated signal component into the isolated signal component. The subtracter 144 subtracts the isolated signal component from the down converted signal to produce the adjusted down converted signal, which is subsequently filtered by filters 130-132 as discussed above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A receiver comprises:
a signal adjust module having a programmable duplexer module coupled to receive a Multiple Frequency Bands Multiple Standards (MFBMS) signal, wherein the MFBMS signal includes a desired signal component, a second desired signal component and an undesired signal component, the programmable duplexer module including:
a plurality of duplexers, each selectively coupled, based on a programming signal, to adjust the MFBMS signal to substantially reduce adverse effects of the undesired signal component on the desired signal component and the second desired signal component to produce an adjusted MFBMS signal; and
a selection module that functions to:
determine spectral positioning of the undesired signal component with respect to the desired signal component and the second desired signal component; and
generate the programming signal based on the spectral position of the undesired signal component, wherein the programming signal selects one or more of the plurality of duplexers; and
a down conversion module coupled to convert the adjusted MFBMS signal into a down converted symbol stream.

2. The receiver of claim 1 wherein
the down conversion module is coupled to convert the adjusted MFBMS signal into the down converted symbol stream including a first symbol stream corresponding to the desired signal component and a second symbol stream corresponding to the second desired signal component.

3. The receiver of claim 2 further comprises:
a baseband processing module coupled to convert the first symbol stream into a first inbound signal in accordance with a first standard of the multiple standards and to convert the second symbol stream into a second inbound signal in accordance with a second standard of the multiple standards.

4. The receiver of claim 1, wherein the programmable duplexer module is coupled to attenuate the undesired signal component with respect to the MFBMS signal based on the programming signal to produce an attenuated MFBMS signal and wherein the signal adjust module further includes:
a low noise amplifier (LNA) module coupled to amplify the attenuated MFBMS signal to produce the adjusted MFBMS signal.

5. The receiver of claim 4, wherein the programmable duplexer module further comprises:
a multiplexer for coupling respective outputs of selected ones of the plurality of duplexers to the LNA module based on the programming signal.

6. The receiver of claim 5, wherein the low noise amplifier module includes a plurality of low noise amplifiers, and wherein the multiplexer couples the respective outputs of the selected ones of the plurality of duplexers to one or more of the plurality of low noise amplifiers based on the programming signal.

7. The receiver of claim 1 wherein the signal adjust module further functions to:
determine the spectral positioning of the undesired signal component with respect to the desired signal component;
determine whether the spectral positioning of the undesired signal component is outside a frequency band that includes the desired signal component; and
when the spectral positioning of the undesired signal component is outside the frequency band that includes the desired signal component, adjust bandwidth of the signal adjust module such that the undesired signal component is outside the bandwidth of the signal adjust module to produce the adjusted MFBMS signal.

8. A transceiver comprises:
a receiver section that converts an inbound Multiple Frequency Bands Multiple Standards (MFBMS) signal into a down converted signal, wherein the inbound MFBMS signal includes a desired signal component, a second desired signal component and an undesired signal component, wherein the receiver section includes a signal adjust module having a programmable duplexer module, the programmable duplexer module including:
a plurality of duplexers, each selectively coupled, based on a programming signal, to adjust the MFBMS signal to substantially reduce adverse effects of the undesired signal component on the desired signal component and the second desired signal component to produce an adjusted MFBMS signal; and
a selection module that is operable to:
determine spectral positioning of the undesired signal component with respect to the desired signal component and the second desired signal component; and
generate the programming signal based on the spectral position of the undesired signal component, wherein the programming signal selects one or more of the plurality of duplexers; and
a transmitter section coupled to convert an outbound symbol stream into an outbound MFBMS signal.

9. The transceiver of claim 8 further comprises:
the transmitter section generating the outbound MFBMS signal based on an orthogonal relationship with the inbound MFBMS signal.

10. The transceiver of claim 8, wherein the receiver section further comprises:
a down conversion module coupled to convert the adjusted MFBMS signal into the down converted signal.

11. The transceiver of claim 10 wherein
the down conversion module is coupled to convert the adjusted MFBMS signal into the down converted symbol stream including a first symbol stream corresponding to the desired signal component and a second symbol stream corresponding to the second desired signal component.

12. The transceiver of claim 11 further comprises:
a baseband processing module coupled to convert the first symbol stream into a first inbound signal in accordance with a first standard of the multiple standards and to convert the second symbol stream into a second inbound signal in accordance with a second standard of the multiple standards.

13. The transceiver of claim 8 wherein the programmable duplexer module is coupled to attenuate the undesired signal component with respect to the MFBMS signal based on the programming signal to produce an attenuated MFBMS signal.

14. The transceiver of claim 13 wherein the signal adjust module further includes:
   a low noise amplifier (LNA) module coupled to amplify the attenuated MFBMS signal to produce the adjusted MFBMS signal.

15. The transceiver of claim 14 wherein the programmable duplexer module further comprises:
   a multiplexer for coupling respective outputs of selected ones of the plurality of duplexers to the LNA module based on the programming signal.

16. The transceiver of claim 15 wherein the low noise amplifier module includes a plurality of low noise amplifiers, and wherein the multiplexer couples the respective outputs of the selected ones of the plurality of duplexers to one or more of the plurality of low noise amplifiers based on the programming signal.

17. The transceiver of claim 8 wherein the selection module includes:
   a duplexer control module coupled to receive the down converted signal during a calibration phase of the receiver section and to generate the programming signal based on the spectral position of the undesired signal component in the down converted signal.

18. The transceiver of claim 8 wherein each of the plurality of duplexers has a different frequency response for attenuating a corresponding undesired frequency, the undesired signal including at least one undesired frequency.

19. The transceiver of claim 8 wherein the signal adjust module further functions to:
   determine the spectral positioning of the undesired signal component with respect to the desired signal component;
   determine whether the spectral positioning of the undesired signal component is outside a frequency band that includes the desired signal component; and
   when the spectral positioning of the undesired signal component is outside the frequency band that includes the desired signal component, adjust bandwidth of the signal adjust module such that the undesired signal component is outside the bandwidth of the signal adjust module to produce the adjusted MFBMS signal.

20. The receiver of claim 1 wherein each of the plurality of duplexers has a different frequency response for attenuating a corresponding undesired frequency, the undesired signal including at least one undesired frequency.

21. The receiver of claim 1 wherein the selection module includes:
   a duplexer control module coupled to receive the down converted signal during a calibration phase and to generate the programming signal based on the spectral position of the undesired signal component in the down converted signal.

* * * * *